US 8,005,011 B2

(12) United States Patent
Yang

(10) Patent No.: US 8,005,011 B2
(45) Date of Patent: Aug. 23, 2011

(54) METHOD AND SYSTEM FOR MEASURING NETWORK PERFORMANCE

(75) Inventor: Daoyan Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/250,237

(22) Filed: Oct. 13, 2008

(65) Prior Publication Data

US 2009/0040942 A1 Feb. 12, 2009

Related U.S. Application Data

(63) Continuation of application No. PCT/CN2007/000505, filed on Feb. 13, 2007.

(30) Foreign Application Priority Data

Apr. 14, 2006 (CN) .......................... 2006 1 0076979
Apr. 14, 2006 (CN) .......................... 2006 1 0076980

(51) Int. Cl.
*H04J 3/14* (2006.01)
(52) U.S. Cl. .......................... 370/253; 370/392; 370/474
(58) Field of Classification Search ............... 370/230.1, 370/231, 232, 235, 236, 252, 253, 395.52; 713/160
See application file for complete search history.

(56) References Cited

U.S. PATENT DOCUMENTS

| 6,795,917 | B1 * | 9/2004 | Ylonen | 713/160 |
|---|---|---|---|---|
| 2003/0039212 | A1 * | 2/2003 | Lloyd et al. | 370/235 |
| 2003/0145082 | A1 | 7/2003 | Son | |
| 2003/0223367 | A1 | 12/2003 | Shay et al. | |
| 2003/0225549 | A1 | 12/2003 | Shay et al. | |
| 2004/0052259 | A1 | 3/2004 | Garcia et al. | |
| 2004/0165602 | A1 | 8/2004 | Park et al. | |
| 2005/0027861 | A1 | 2/2005 | Shah et al. | |
| 2005/0083969 | A1 | 4/2005 | Lee et al. | |
| 2005/0249125 | A1 * | 11/2005 | Yoon et al. | 370/252 |
| 2008/0201478 | A1 | 8/2008 | Yao et al. | |

FOREIGN PATENT DOCUMENTS

CN 1400774 A 3/2003
(Continued)

OTHER PUBLICATIONS

European Patent Office, First Examination Report in European Application No. 07710930.4 (Mar. 18, 2009).
(Continued)

*Primary Examiner* — Seema S Rao
*Assistant Examiner* — Leon Andrews
(74) *Attorney, Agent, or Firm* — Leydig, Voit, Mayer, Ltd.

(57) ABSTRACT

A method for measuring network performance is disclosed to solve the problem in active network performance measurement that a measurement point on receiving a packet is unable to determine the source of the packet after the network address translation (NAT). The method includes that a first measurement point constructs a probe packet containing address information about the first measurement point in a data field thereof based on a measurement instruction and sends the probe packet to a second measurement point via a NAT device for translating the network address, and the second measurement point receives the probe packet and determines the source of the packet according to the address information in the packet; and finally calculates network performance metrics, according to related information in the probe packet. A network system is also disclosed.

13 Claims, 10 Drawing Sheets

FOREIGN PATENT DOCUMENTS

| CN | 1492630 A | 4/2004 |
|---|---|---|
| CN | 1691664 A | 11/2005 |
| CN | 1866880 A | 11/2006 |
| WO | WO 99/35799 A2 | 7/1999 |

OTHER PUBLICATIONS

State Intellectual Property Office of the People's Republic of China, Written Opinion of the International Searching Authority in International Patent Application No. PCT/CN2007/000504 (May 24, 2007).

State Intellectual Property Office of the People's Republic of China, Written Opinion of the International Searching Authority in International Patent Application No. PCT/CN2007/000505 (May 24, 2007).

State Intellectual Property Office of the People's Republic of China, Written Opinion of the International Searching Authority in International Patent Application No. PCT/CN2007/000506 (May 24, 2007).

State Intellectual Property Office of the People's Republic of China, International Search Report in International Patent Application No. PCT/CN2007/000506 (May 17, 2007).

Yang et al., First Information Disclosure Statement in U.S. Appl. No. 12/250,213 (Oct. 13, 2008).

Yang et al., Second Information Disclosure Statement in U.S. Appl. No. 12/250,213 (Dec. 17, 2009).

Yang et al., Third Information Disclosure Statement in U.S. Appl. No. 12/250,213 (Jan. 8, 2010).

* cited by examiner

| IP header | | | UPD header | | | | Flag | Data | | |
|---|---|---|---|---|---|---|---|---|---|---|
| Omit | SrcIPA | DstIPB | SrcPortA | DestPortB | Len | ChkSum | Inf | SrcIPA | SrcPortA | PAD |

FIG. 3A

| IP header | || UPD header |||| Data |||
|---|---|---|---|---|---|---|---|---|---|
| Omit | SrcIPNat | DstIPB | SrcPortNat | DestPortB | Len | ChkSum | SrcIPA | SrcPortA | PAD |

FIG. 3B

| IP header | | | UPD header | | | | Data |
|---|---|---|---|---|---|---|---|
| Omit | SrcIPB | DstIPNat | SrcPortB | DestPortNat | Len | ChkSum | PAD |

FIG. 3C

| IP header | | | UPD header | | | | Data |
|---|---|---|---|---|---|---|---|
| Omit | SrcIPB | DstIPA | SrcPortB | DestPortA | Len | ChkSum | PAD |

FIG. 3D

METHOD AND SYSTEM FOR MEASURING NETWORK PERFORMANCE

CROSS-REFERENCE TO RELATED APPLICATION

This application is a continuation of International Patent Application No. PCT/CN2007/000505, filed Feb. 13, 2007, which claims priority to Chinese Patent Application No. 200610076979.6, filed Apr. 14, 2006, both of which are hereby incorporated by reference in their entirety.

BACKGROUND OF THE INVENTION

1. Field of the Technology

The present invention relates to measurement techniques in the communication field, and more particularly, to a method and system for measuring network performance.

2. Description of the Related Art

With the rapid development of Internet technologies and swift growth of network services, a great demand for network resources has been emerging, and meanwhile the network is becoming more and more complicated. The increasing network subscribers and applications exert heavy burden on the network and cause overloading operations of network equipments, thus affecting the network performance. Therefore, the performance metrics of the network need to be extracted and analyzed to improve the network performance. As a result, the network performance measurement emerges as required. The main purpose of the network performance measurement is discovering network bottlenecks, optimizing network configurations, and further recognizing potential dangers in the network, so as to more efficiently perform the network performance management, provide verification and control of the network service quality, and quantize, compare, and verify the service quality index of the service provider.

The most commonly adopted method for measuring IP network performance can be classified into two categories, namely, active measurement and passive measurement. The active measurement includes employing a measurement tool to purposely and actively generate a measurement flow on a selected measurement point, then injecting the flow into a network, and analyzing the network performance by measuring the transmission condition of a data flow. The passive measurement includes employing a measurement device to monitor a network on a link or device (such as a router or switch) without generating unwanted flows.

The performance measurement can be classified into one-way network performance measurement and two-way network performance measurement in terms of direction. The one-way network performance measurement means measuring the network performance metrics in only one direction from a measurement point A to the other measurement point B. The two-way network performance measurement means measuring the network performance metrics from a measurement point A to the other measurement point B and then back to the measurement point A. For a P2P communication, the traveling path varies in the to-and-fro directions, or the quality of service (QoS) varies on the same path in the to-and-fro directions, so the one-way network performance is not simply obtained by dividing the two-way delay by two, and in the subsequent descriptions, the network performance measurement is one-way network performance measurement without particular emphasis.

Generally, a measurement system is constituted by a measurement controller and measurement points deployed in a network. The active measurement method substantially includes the following steps:

1. The measurement controller configures two measurement points A, B participating in the performance measurement;

2. The measurement point A constructs a probe packet attached with a serial number and time stamp information, and sends the probe packet to the measurement point B. That is to say, the source IP address of the probe packet is the address of the measurement point A, and the destination IP address thereof is the address of the measurement point B; and 3. If the measurement point B receives the probe packet, a delay of the packet can be obtained, according to the sending time stamp carried by the probe packet and the time stamp information on receiving the packet. If the measurement point B does not receive the probe packet, a packet loss situation can be determined according to the consecutive serial number, and a packet loss ratio is thus obtained. Further, other performance metrics such as variation and network unavailability can be deduced from the delay and the packet loss ratio.

For the current network generally adopting IPv4, in order to solve the problem of insufficient IP address resources, the deployment of network address translation/network address port translation (NAT/NAPT) is very common, as shown in FIG. 1. As for the active measurement, if the NAPT/NAT exists on an end-to-end path, the NAT/NAPT device shields the internal network and blocks the transparency of the internal network. During the research, the inventor discovers that though the measurement points located in the internal network and the external network can normally receive/transmit the probe packet and calculate the network performance metrics, the measurement point in the external network is unable to determine whether a probe packet comes from the internal network or the external network (as the NAT/NAPT device has already translated a private IP address into a public IP address), nor actively access the measurement point in the internal network.

In an IPv4/IPv6 hybrid networking environment, if a network address translation-protocol translation (NAT-PT) technique is adopted to communicate an IPv4 network with an IPv6 network, the mapping between IPv4 addresses and IPv6 addresses is performed on an NAT-PT device, and thus the problem occurring to the NAT/NAPT on the active network performance measurement still exists.

SUMMARY OF THE INVENTION

Accordingly, in an embodiment, the present invention is directed to a method and system for measuring network performance, so as to solve the problem in active network performance measurement that a measurement point on receiving a packet is unable to determine the source of the packet after the network address translation (NAT), and further enable the measurement point to initiatively send a probe packet to a peer measurement point.

A method for measuring network performance in accordance with an embodiment of the present invention is provided that includes the following steps:

a first measurement point constructs a probe packet containing address information about the first measurement point in a data field thereof;

the first measurement point sends the probe packet to a second measurement point, and an NAT device exists on a path from the first measurement point to the second measurement point;

on receiving the probe packet, the second measurement point determines the source of the probe packet according to the address information in the packet; and network performance metrics are calculated according to related information in the probe packet.

A method for measuring network performance in accordance with another embodiment of the present invention is provided that includes the following steps:

a first measurement point constructs a notification packet containing address information about the first measurement point in a data field thereof, and sends the packet to a second measurement point via a network address translation (NAT) device;

the second measurement point obtains a corresponding network address binding relationship according to the address information and source address information in the notification packet;

the second measurement point constructs a probe packet to be sent to the first measurement point according to the network address binding relationship, and sends the packet to the first measurement point via the NAT device; and on receiving the probe packet, the first measurement point calculates network performance metrics according to related information in the probe packet.

A network system in accordance with an embodiment of the present invention is provided that includes:

a NAT device adapted to translate a network address;

a measurement controller adapted to deliver a measurement configuration to measurement points;

a first device adapted to construct at a first measurement point of the measurement points a probe packet containing address information about the first measurement point in a data field thereof according to the measurement configuration, and then send the probe packet to a second measurement point via the NAT device; and a second device adapted to receive the probe packet at the second measurement point, and determine the source of the probe packet according to the address information in the packet;

wherein the second device calculates network performance metrics according to related information in the probe packet and report the network performance metrics to the measurement controller, or, on receiving the probe packet, the second device generates and reports a packet abstract data to the measurement controller, and the measurement controller calculates network performance metrics.

A network system in accordance with another embodiment of the present invention is also provided that includes:

a NAT device adapted to translate a network address;

a measurement controller adapted to deliver a measurement configuration to measurement points;

a first device adapted to construct at a first measurement point of the measurement points a notification packet containing address information about the first measurement point in a data field thereof according to the measurement configuration, and then send the notification packet to a second measurement point via the NAT device;

a second device adapted to obtain a corresponding network address binding relationship according to the address information and source address information contained in the data field of the notification packet, then construct a probe packet according to the binding relationship, and send the probe packet to the first device via the NAT device;

wherein the first device calculates network performance metrics according to related information in the probe packet and reports the network performance metrics to the measurement controller, or, on receiving the probe packet, the first device generates and reports a packet abstract data to the measurement controller, and the measurement controller calculates network performance measurement metrics.

According to the embodiments of the present invention, a first measurement point in an internal network or IPv4 network sends a probe packet with address information of itself to a second measurement point in an external network or IPv6 network via a network address translation (NAT) device, so that the second measurement point is able to determine the source of the probe packet. Furthermore, the second measurement point is enabled to initiatively send a probe packet to the first measurement point, so as to realize an end to end network performance measurement in an NAT/NAPT environment.

BRIEF DESCRIPTION OF THE DRAWINGS

The present invention is described in detail as follows by reference to the accompanying embodiments and drawings, among which:

FIGS. 3A, 3B, 3C, and 3D are schematic views illustrating a format of a probe packet, according to the first embodiment of the present invention;

DETAILED DESCRIPTION OF THE EMBODIMENTS

In an active network performance measurement performed in a NAPT/NAT environment, in order to enable a measurement point located in a public network to distinguish a probe packet coming from a measurement point in an internal network, according to an embodiment of the present invention, a first measurement point located in the internal network sends address information (including IP address and port number) of itself to a second measurement point located in the public network. Also in an active network performance measurement performed in a NAPT/NAT environment, in order to enable a measurement point located in an IPv6 network to distinguish a probe packet coming from a measurement point in an IPv4 network, according to an embodiment of the present invention, a first measurement point located in the IPv4 network sends address information (including IP address and port number) of itself to a second measurement point located in the IPv6 network. The process will be illustrated in detail below with the accompanying drawings.

First Embodiment

In this embodiment, for example, a first measurement point located in an internal network encapsulates address information of itself in a probe packet for measurement and then sends the probe packet to a second measurement point located in a public network.

Figure 1:
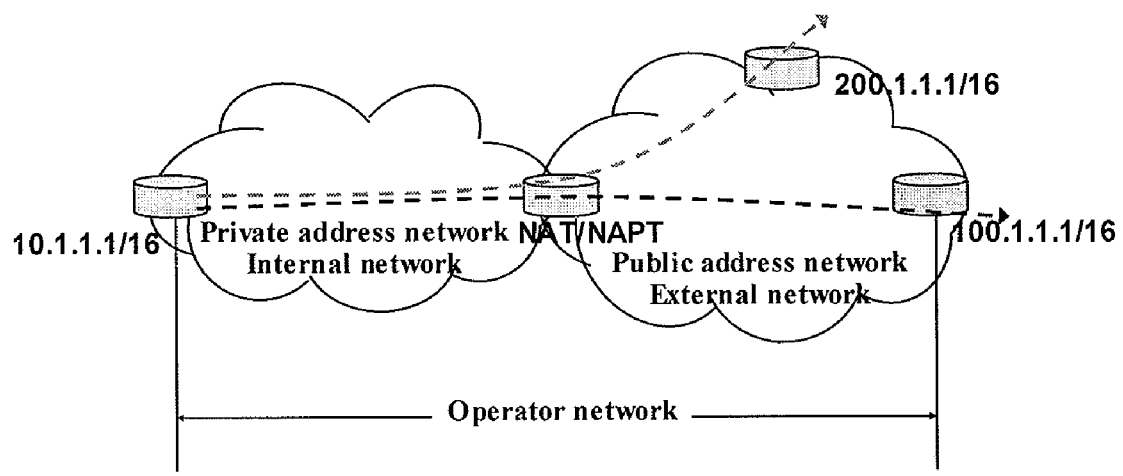
FIG. 1 is a schematic view showing an existing reference model on application of a NAT.
Figure 2:
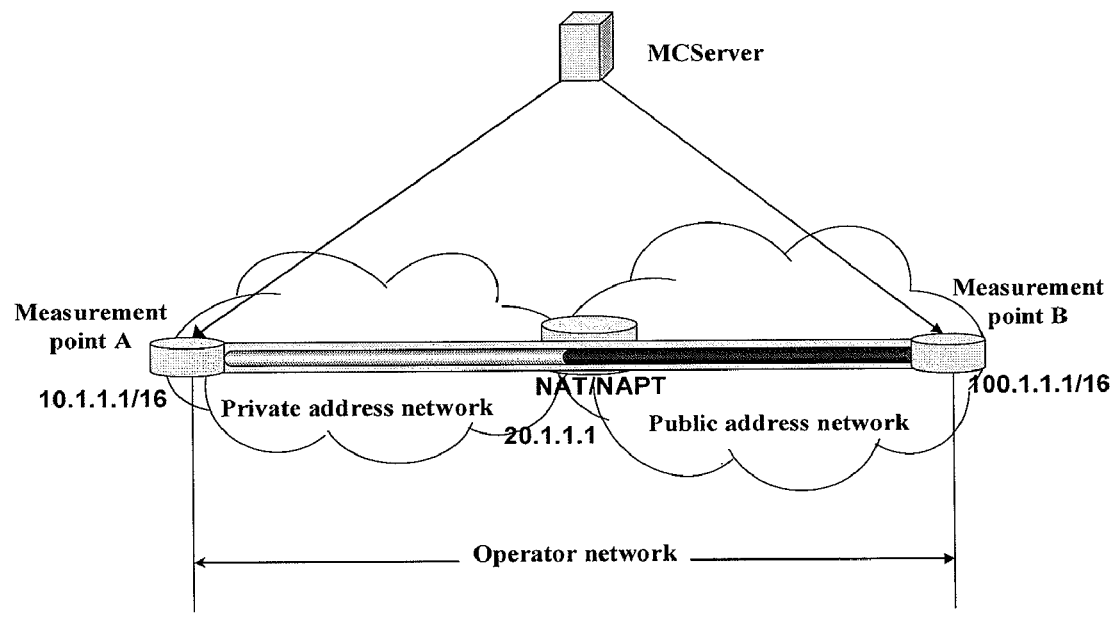
FIG. 2 is a schematic network architectural view illustrating an end-to-end network performance measurement in a NAT/NAPT environment, according to a first embodiment of the present invention.

Referring to FIG. 2, a network system includes a measurement controller (MCServer), a device A located at a measurement point A in an internal network, a device B located at a measurement point B in a public network, and a network address translation (NAT) device for translating network address between the measurement point A and the measurement point B.

The NAT device is adapted to translate a network address, i.e. to substitute an external public network IP address for a private network IP address as source address in a data packet transmitted by the device A to the device B, and substitute the private network IP address for the external public network IP address as destination address in a data packet transmitted by the device B to the device A.

The measurement controller is adapted to initiate and terminate a network measurement task, configure measurement points, and collect measurement data, then calculate network performance metrics, and report the network performance metrics to a subscriber. The configuration of the measurement points includes delivering a measured flow description (for example, quintuple and level of QoS), sampling frequency, and sampling algorithm (for example, Possion distribution).

The device A is adapted to receive a measurement instruction from the measurement controller, construct a probe packet containing address information about this measurement point in a data field, and send the packet to the device B via the NAT device.

The device B is adapted to receive the probe packet at the second measurement point, and determine the source of the probe packet according to the address information in the packet. The device B obtains a corresponding network address binding relationship, according to the address information and source address information contained in the packet, and initiatively sends a probe packet to the device A according to the mapping relationship. When reporting the network performance metrics, the device B further restores the IP address and port number before translation according to the mapping relationship.

The device A and the device B attach time stamp information to the probe packet, and calculate network performance metrics such as delay based on the time stamp information. On receiving the probe packet, the device A or B calculates the network performance metrics according to related information in the packet, and then sends the network performance metrics to the measurement controller, instead of letting the measurement controller perform the calculation. Alternatively, on receiving the probe packet, the device A or B generates and reports a packet abstract data to the measurement controller, and the measurement controller calculates the network performance metrics. The packet abstract data includes not only a packet ID, a flow ID, and the time stamp information, but also a part of or the whole content of the packet.

The probe packet with IP address and port number information in a data field may be in a format as shown in FIG. 3A and FIG. 3B. In order to enable the device B at the measurement point B to distinguish the packet attached with the IP address and port number information about the measurement point A from other packets, a flag can be added in the packet for identification.

FIG. 3A shows a format of the probe packet of the measurement point A after encapsulation. As shown in FIG. 3A, The source IP address SrcIPA is an IP address of the measurement point A, the destination IP address DstIPB is an IP address of the measurement point B, the source port number SrcPortA is a port number of the measurement point A, the destination port number DestPortB is a port number of the measurement point B, Len represents data length, ChkSum represents checksum, and PAD represents a data part.

FIG. 3B shows a format of the probe packet after address translation by the NAT device. As shown in FIG. 3B, the source IP address SrcIPNat is an external IP address of the NAT device, and the source port SrcPortNat is a port number of the NAT device.

FIG. 3C shows a format of the probe packet after encapsulation in the measurement point B. FIG. 3D shows a format of the probe packet which is sent by the measurement point B and address thereof is translated by NAT.

Figure 4A:
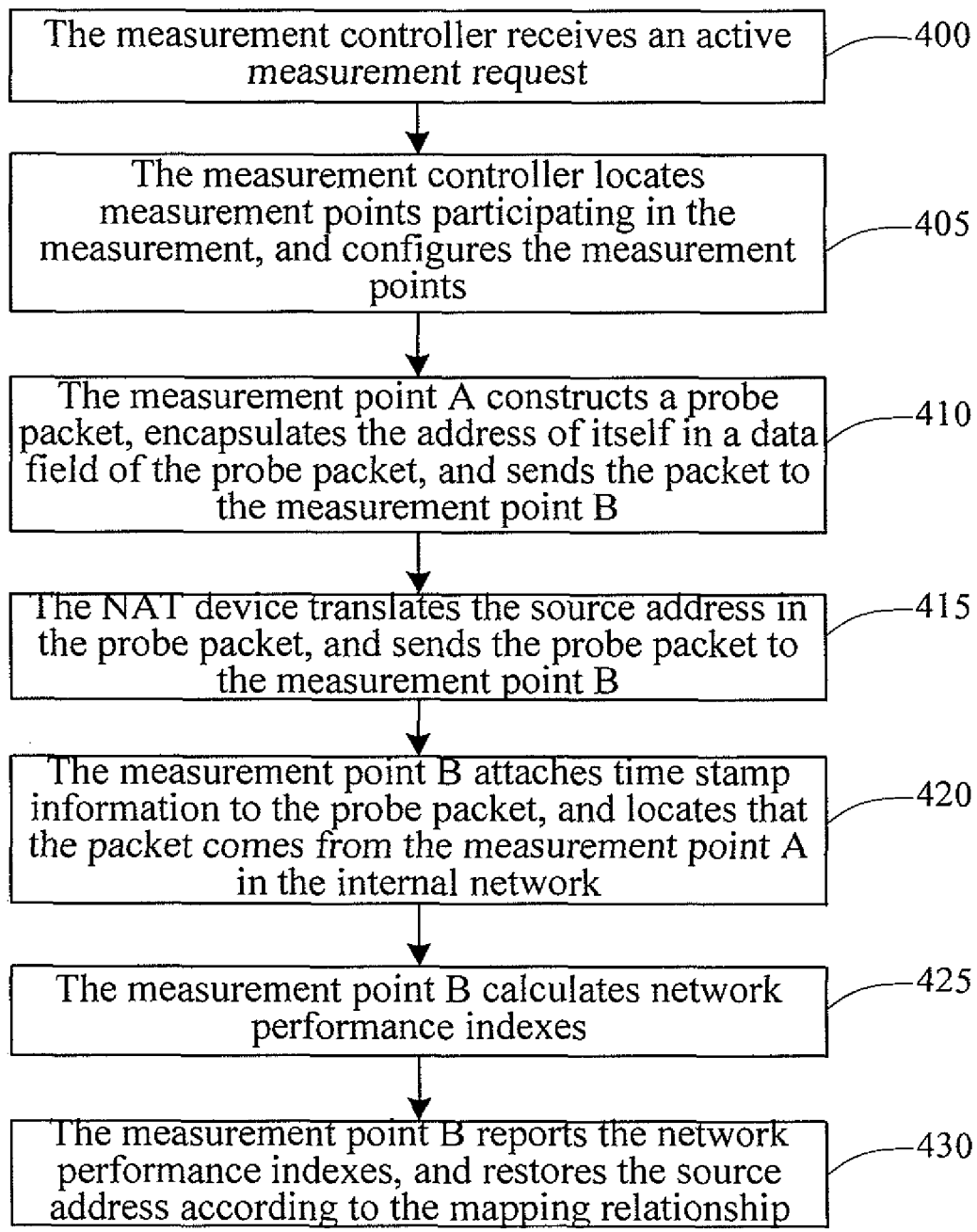
FIGS. 4A and 4B are flow charts of processes of an active measurement on network performance, according to the first embodiment of the present invention.

Referring to FIG. 4A, the process of an active measurement on network performance between the measurement point A and the measurement point B is described as follows.

In Step 400, the measurement controller receives a measurement request. The measurement request contains a source IP address and a source port number, a destination IP address and a destination port number, and a service type.

In Step 405, according to the measurement request, the measurement controller locates measurement points participating in the measurement, i.e. the measurement points A and B, and configures the measurement points.

In Step 410, the device A at the measurement point A constructs a probe packet, encapsulates the source IP address and source port number of the probe packet in a data field of the probe packet, and sends the packet to the measurement point B. Further, the device A sends the probe packet attached with time stamp information to the measurement point B.

In Step 415, the NAT device substitutes an external IP address and port number for the source IP address and port number in the probe packet, and transmits the probe packet to the measurement point B.

In Step 420, the device B at the measurement point B receives the probe packet and attaches time stamp information to the probe packet, obtains the source IP address and source port number information from the designated data field of the probe packet, and locates that the packet comes from the measurement point A in the internal network according to the information.

In addition, the device B obtains and stores an address translation mapping relationship according to the source IP address and source port number in the data field, as well as the source IP address and source port number in the header of the probe packet.

In Step 425, the device B calculates network performance metrics such as delay and packet loss ratio according to the serial number and time stamp information in the probe packet.

In Step 430, the device B reports the network performance metrics to the measurement controller, and restores the source address in the metrics to the IP address and port number of the measurement point A, according to the mapping relationship.

Figure 4B:
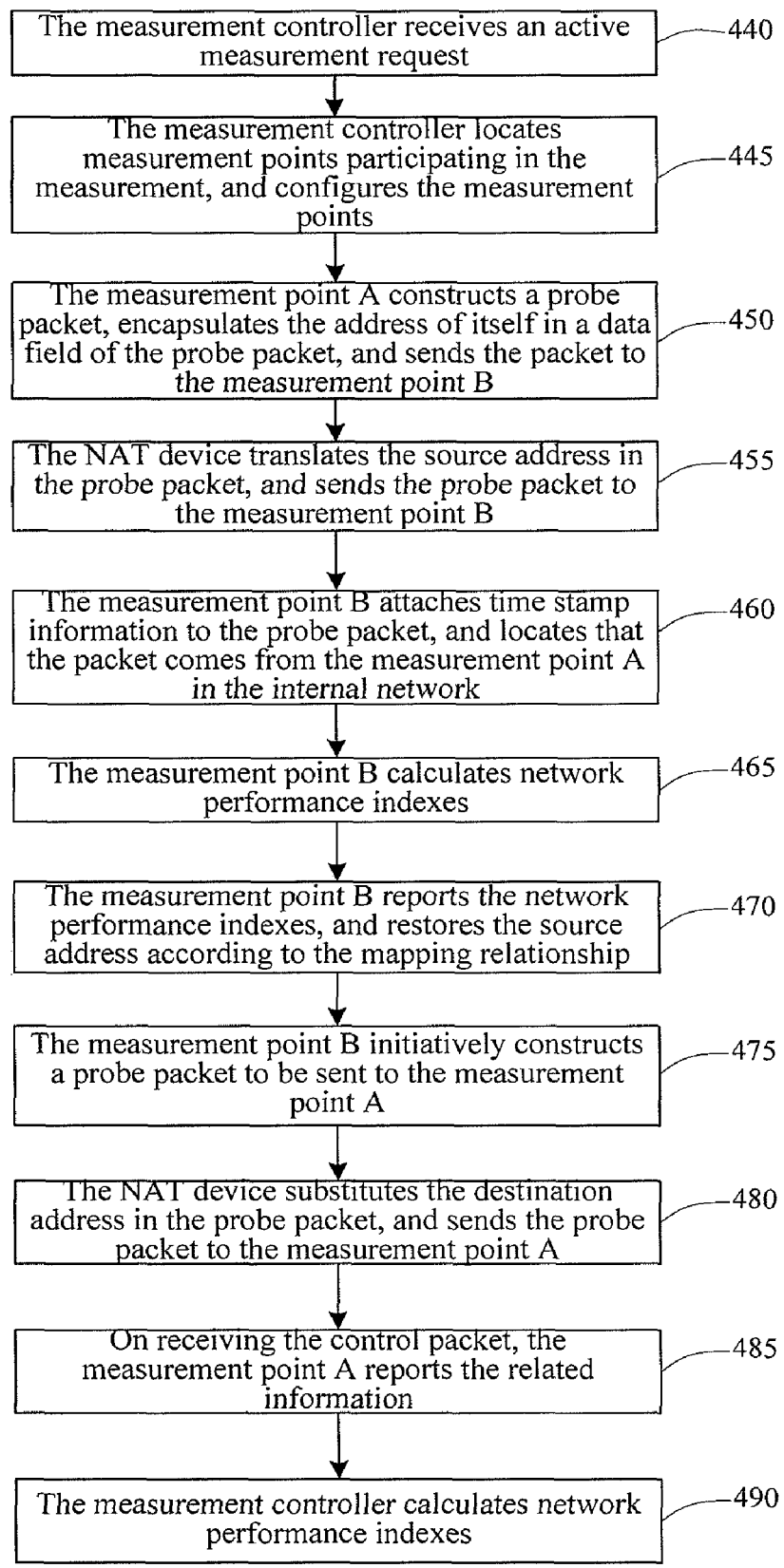

Referring to FIG. 4B, when the measurement controller issues to the measurement point B an instruction of measuring the network performance from the measurement point B to the measurement point A, the process not only includes the steps in FIG. 4A, but also the following processes from the measurement point B to the measurement point A.

Steps 440 to 470 are identical to Steps 400 to 430 in FIG. 4A.

In Step 475, the device B at the measurement point B initiatively constructs a probe packet to be sent to the measurement point A, fills the probe packet with the external IP address and port number of the NAT device as the destination address according to the mapping relationship, and then sends the packet attached with time stamp information.

In Step 480, the NAT device substitutes the IP address and port number of the measurement point A for the destination IP address and port number in the probe packet, and then sends the probe packet to the measurement point A.

In Step 485, on receiving the control packet, the device A attaches the time stamp information to the packet, and then reports the packet to the measurement controller.

In Step 490, the measurement controller calculates network performance metrics such as delay and packet loss ratio according to the serial number and time stamp information in the probe packet.

When reaching the preset measurement time or fulfilling the measurement task, or under an abnormal circumstance, the measurement controller ends the measurement task.

Referring to FIG. 2, the process of transmitting the IP address and port number of the measurement point A to the measurement point B is taken as an example for illustration.

The IP address of the measurement point A is 10.1.1.1, the external public network IP address of the NAT device is 200.1.1.1, and the IP address of the measurement point B is 100.1.1.1.

On receiving the measurement request, the measurement controller locates the measurement point A and the measurement point B, and issues a measurement instruction to the measurement point A. For the measurement point A, the IP address of its target measurement point is 100.1.1.1.

The device A constructs a probe packet, encapsulates the IP address 10.1.1.1 and port number 1000 of this measurement point in a data field while the remaining parts of the probe packet are identical to those of the current probe packet, and then sends out the probe packet.

In the NAT device, the network address binding relationship is that the internal IP address 10.1.1.1 and port number 1000 are corresponding to the external IP address 200.1.1.1 and port number 2000. On receiving the probe packet, the NAT device substitutes 200.1.1.1 for the source IP address 10.1.1.1 and 2000 for the source port number 1000, and then sends the probe packet to the measurement point B.

On receiving the probe packet, the device B obtains the IP address 10.1.1.1 and port number 1000 of the measurement point A, and further obtains the mapping relationship between the internal IP address 10.1.1.1 and port number 1000 and the external IP address 200.1.1.1 and port number 2000, according to the source IP address in the packet. Thereby, the measurement point B is able to determine that the probe packet comes from the internal network. Besides, under the circumstance that the measurement controller issues to the measurement point B an instruction of sending the probe packet to the measurement point A with a destination address of 10.1.1.1, the measurement point B may initiatively send the probe packet to the measurement point A according to the obtained mapping relationship.

Second Embodiment

In this embodiment, for example, a first measurement point located in an internal network encapsulates address information of itself in a notification packet and then sends the packet to a second measurement point located in a public network, so that the second measurement point sends a control file to the first measurement point to implement a network performance measurement.

Figure 5:
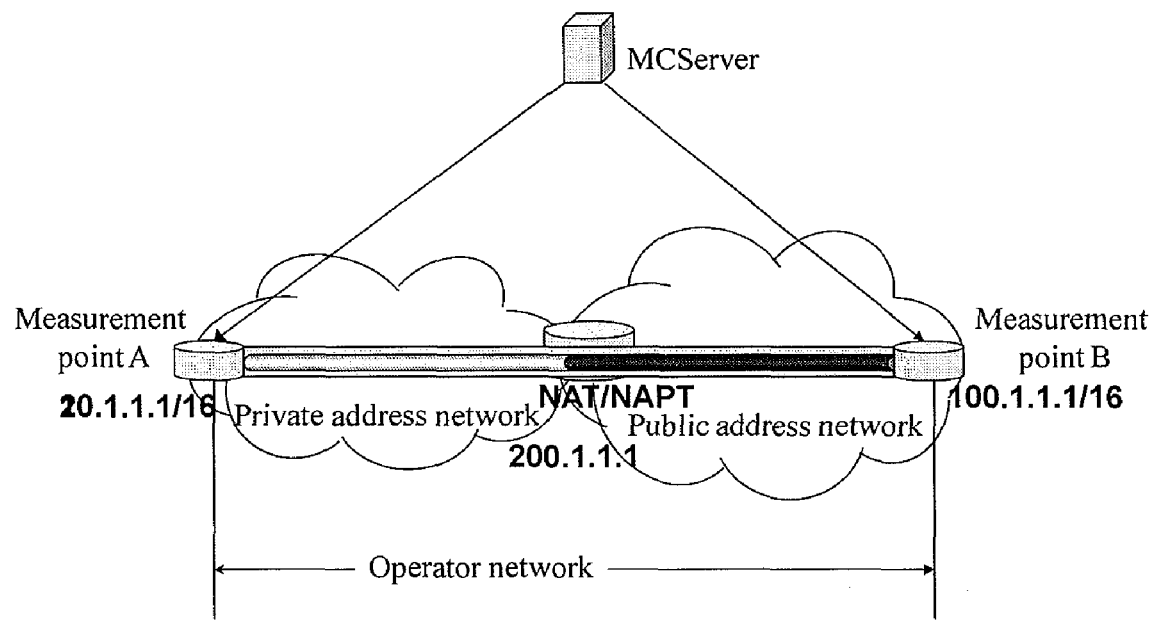
FIG. 5 is a schematic network architectural view illustrating an end-to-end network performance measurement in a NAT/NAPT environment, according to a second embodiment of the present invention.

Referring to FIG. 5, a network system includes a measurement controller (MCServer), a device A located at a measurement point A in an internal network, a device B located at a measurement point B in a public network, and a NAT device adapted to translate network address between the measurement point A and the measurement point B.

The NAT device is adapted to translate network address, i.e. to substitute an external public network IP address for a private network IP address as source address in a data packet transmitted by the device A to the device B, and substitute the private network IP address for the external public network IP address as destination address in a data packet transmitted by the device B to the device A.

The measurement controller is adapted to initiate and terminate a network measurement task, configure a measurement point, and collect measurement data, then calculate network performance metrics, and report the network performance metrics to a subscriber. The configuration of the measurement points includes delivering a measured flow description (for example, quintuple and level of QoS), sampling frequency, and sampling algorithm (for example, Possion distribution).

The device A is adapted to receive a measurement instruction from the measurement controller at the measurement point A, construct a notification packet containing address information about this measurement point and send the notification packet to the device B via the NAT device, and receive a probe packet sent from the measurement point B.

The device B is adapted to receive the notification packet at the second measurement point, obtain a corresponding network address binding relationship according to the source address information and the address information in the packet, and then initiatively send the probe packet to the device A according to the mapping relationship.

On receiving the probe packet, the device A may calculate the network performance metrics according to related information in the packet, and then send the network performance metrics to the measurement controller, instead of letting the measurement controller do the calculation.

The device A and the device B attach time stamp information to the probe packet, and calculate network performance metrics such as delay based on the time stamp information.

Figure 6:
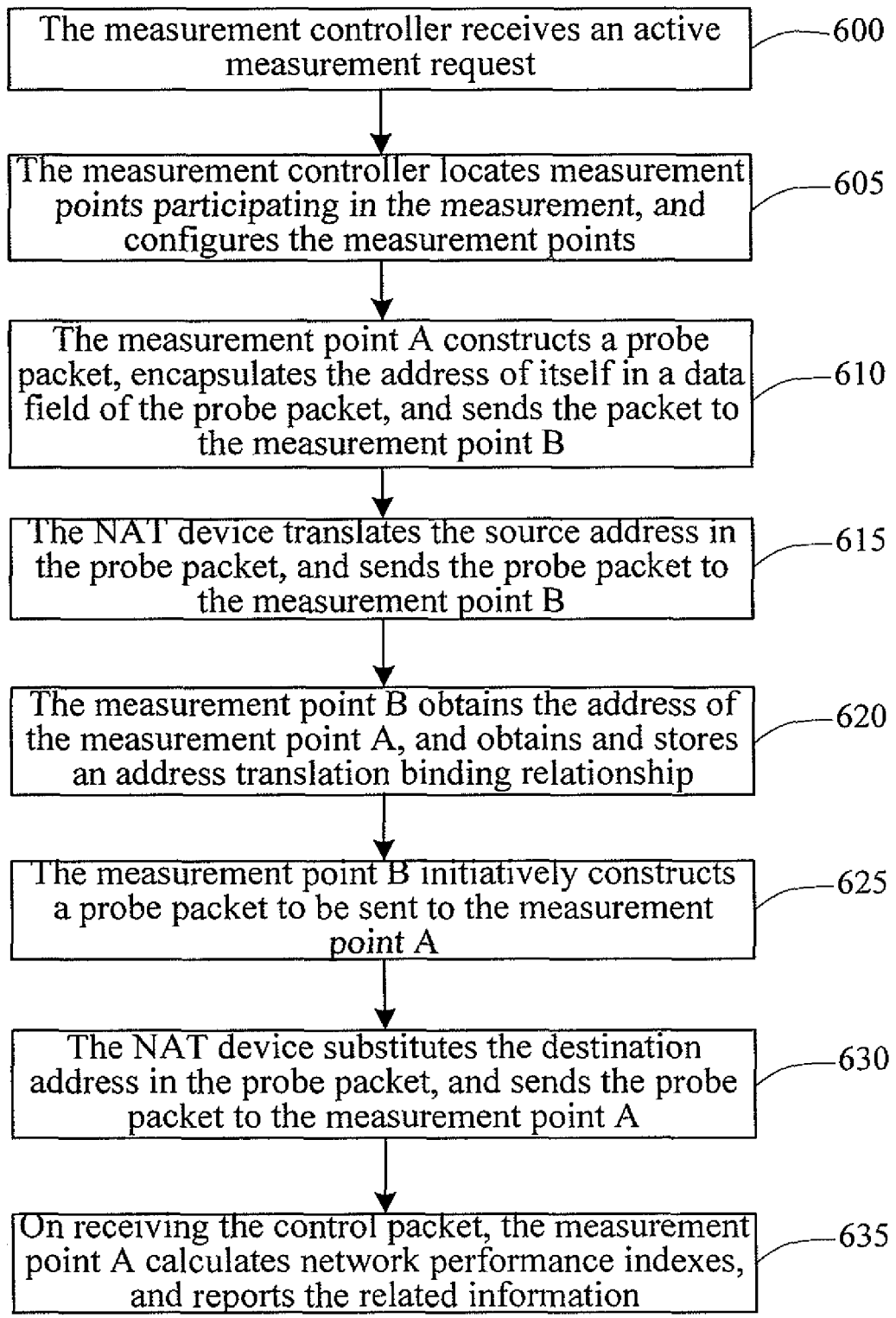
FIG. 6 is a flow chart of processes of an active measurement on network performance, according to the second embodiment of the present invention.

Referring to FIG. 6, the processes of an active measurement on network performance between the measurement point A and the measurement point B is described as follows.

In Step 600, the measurement controller receives a measurement request. The measurement request contains a source IP address and a source port number, a destination IP address and a destination port number, and a service type.

In Step 605, according to the measurement request, the measurement controller locates measurement points participating in the measurement, i.e. a measurement point A and a measurement point B, and configures the measurement points.

In Step 610, the device A at the measurement point A constructs a notification packet containing the IP address and port number of this measurement point in a data field, and sends the packet attached with time stamp information to the measurement point B.

In Step 615, the NAT device substitutes an external IP address and port number for the source IP address and port number in the notification packet, and sends the packet to the measurement point B.

In Step 620, on receiving the notification packet, the device B at the measurement point B obtains the IP address and port number information of the measurement point A from the data field, and obtains and stores an address translation mapping relationship, according to the source IP address and source port number in the packet header.

In Step 625, the device B at the measurement point B initiatively constructs a probe packet to be sent to the measurement point A, fills the probe packet with the external IP address and port number of the NAT device as the destination address according to the mapping relationship, and then sends the packet attached with time stamp information.

In Step 630, the NAT device substitutes the IP address and port number of the measurement point A for the destination IP address and port number in the probe packet, and then sends the probe packet to the measurement point A.

In Step 635, on receiving the control packet, the device A attaches the time stamp information to the probe packet, calculates network performance metrics such as delay and packet loss ratio, according to the serial number and time stamp information in the probe packet, and then reports the network performance metrics to the measurement controller.

Referring to FIG. 5, the processes of transmitting the IP address and port number of the measurement point A to the measurement point B are taken as an example for illustration.

The IP address of the measurement point A is 20.1.1.1, the external public network IP address of the NAT device is 200.1.1.1, and the IP address of the measurement point B is 100.1.1.1.

On receiving the measurement request, the measurement controller locates the measurement point A and the measurement point B, and issues a measurement instruction to the measurement points A and B. As for the measurement point B, the IP address of its target measurement point is 20.1.1.1.

The device A constructs a notification packet, encapsulates the IP address 20.1.1.1 and port number 3000 of this measurement point in a data field of the notification packet, and then sends out the notification packet.

In the NAT device, the network address binding relationship is that the internal IP address 20.1.1.1 and port number 3000 are corresponding to the external IP address 200.1.1.1 and port number 2000. On receiving the notification packet, the NAT device substitutes the external IP address 200.1.1.1 and port number 2000 for the source IP address 20.1.1.1 and the source port number 3000, and then sends the packet to the measurement point B.

On receiving the packet, the device B obtains the IP address 20.1.1.1 and port number 3000 of the measurement point A from the packet, and further obtains the mapping relationship between the internal IP address 20.1.1.1 and port number 3000 and the external IP address 200.1.1.1 and port number 2000, according to the source IP address in the packet. As such, the measurement point B constructs a probe packet according to the obtained mapping relationship, attaches a time stamp to the packet which the destination address thereof is the IP address 200.1.1.1, and the destination port number thereof is the port number 2000, and then sends out the packet.

On receiving the probe packet, the NAT device substitutes the IP address 20.1.1.1 and port number 3000 for the IP address 200.1.1.1 and port number 2000 in the destination address, and then sends the packet to the measurement point A.

Though the above two embodiments both take two measurement points respectively located in a public network and a private network as an example, the present invention is not limited thereto. The above methods are also applicable to a network adopting a NAT-PT technique to achieve communication between IPv4 network and IPv6 network. For example, the measurement point A is located in an IPv6 network, and the measurement point B is located in an IPv4 network. Thus, the address translation mapping relationship on the NAT-PT device is the mapping relationship between an IPv4 address and an IPv6 address. The rest processing is similar to the above, and will not be repeated herein.

According to the above embodiments of the present invention, a first measurement point in an internal network or IPv4 network sends a probe packet with address information (for example, IP address and port number) of itself to a second measurement point in an external network or IPv6 network via a network address translation (NAT) device, so that the second measurement point is able to determine the source of the probe packet. Furthermore, the second measurement point is enabled to initiatively send a probe packet to the first measurement point, so as to realize an end to end network performance measurement in a NAT/NAPT environment.

Apparently, those in the art can make modifications and variations without departing from the spirit of and scope of the present invention. And equivalent modifications and variations made based on the claims of the present invention also fall within the scope of the present invention.

What is claimed is:

1. A network system, comprising:
    a network address translation (NAT) device, configured to translate a network address;
    a measurement controller, configured to receive a measurement request, locate measurement points participating in the measurement according to the measurement request, and deliver a measurement configuration to the measurement points, wherein the measurement request contains a source IP address, a source port number, a destination IP address and a destination port number, wherein the measurement points include a first measurement point which is located according to the source IP address and the source port number, and a second measurement point which is located according to the destination IP address and the destination port number;
    a first device, configured to construct at the first measurement point of the measurement points a notification packet containing the source IP address and the source port number of the first measurement point in a data field thereof according to the measurement configuration, and then send the notification packet to the second measurement point via the NAT device; and
    a second device, configured to obtain at the second measurement point of the measurement points a corresponding network address binding relationship according to an external IP address, an external port number, the source IP address and the source port number in the notification packet, then construct a probe packet according to the binding relationship, and initiatively send the probe packet to the first device via the NAT device;
    wherein the first device calculates network performance metrics according to related information in the probe packet and reports the network performance metrics to the measurement controller; or, on receiving the probe packet, the first device generates and reports a packet abstract data to the measurement controller, and the measurement controller calculates the network performance metrics;
    wherein the NAT device is configured to:
    (a) substitute the external IP address and port number for the source IP address and port number in the notification packet, and send the notification packet to the second measurement point; and
    (b) substitute the IP address and port number of the first measurement point for the destination IP address and port number in the probe packet, and send the probe packet to the first measurement point.

2. The network system according to claim 1, wherein the first device is located in a private network, and the second device is located in a public network; or, the first device is located in an IPv6 network, and the second device is located in an IPv4 network.

3. A method for measuring network performance, comprising:
   receiving, by a measurement controller, a measurement request;
   locating, by the measurement controller, measurement points participating in the measurement according to the measurement request, and delivering a measurement configuration to the measurement points, wherein the measurement request contains a source IP address, a source port number, a destination IP address and a destination port number, wherein the step of locating measurement points participating in the measurement according to the measurement request comprises locating a first measurement point according to the source IP address and the source port number and locating a second measurement point according to the destination IP address and the destination port number;
   constructing, by the first measurement point, a probe packet containing the source IP address and the source port number of the first measurement point in a data field thereof according to the measurement configuration;
   sending, by the first measurement point, the probe packet constructed by the first measurement point to the second measurement point, wherein a network address translation (NAT) device exists on a path from the first measurement point to the second measurement point;
   determining, by the second measurement point, the source of the probe packet constructed by the first measurement point according to the source IP address and the source port number in the probe packet constructed by the first measurement point on receiving the probe packet constructed by the first measurement point; and
   calculating, by the second measurement point, network performance metrics according to related information in the probe packet constructed by the first measurement point and reporting the network performance metrics to the measurement controller; or, on receiving the probe packet constructed by the first measurement point, generating and reporting, by the second measurement point, a packet abstract data to the measurement controller, and calculating, by the measurement controller, the network performance metrics;
   wherein the NAT device substitutes an external IP address and an external port number for the source IP address and the source port number in the probe packet constructed by the first measurement point, and wherein the second measurement point further obtains a corresponding network address binding relationship, according to the external IP address, the external port number, the source IP address and the source port number in the probe packet.

4. The method according to claim 3, further comprising:
   constructing, by the second measurement point, a probe packet, according to the network address binding relationship;
   receiving and translating, by the NAT device, the probe packet constructed by the second measurement point, and then initiatively sending the probe packet constructed by the second measurement point to the first measurement point; and
   calculating, by the first measurement point, network performance metrics, according to related information in the probe packet constructed by the second measurement point on receiving the probe packet constructed by the second measurement point and reporting the network performance metrics to an measurement controller; or, on receiving the probe packet constructed by the second measurement point, generating and reporting, by the first device, a packet abstract data to the measurement controller, and calculating, by the measurement controller, the network performance metrics.

5. The method according to claim 4, wherein the first and the second measurement points respectively attach time stamp information to the probe packet for calculating the network performance metrics.

6. The method according to claim 4, wherein the first measurement point is located in a private network, and the second measurement point is located in a public network; or, the first measurement point is located in an IPv6 network, and the second measurement point is located in an IPv4 network.

7. A method for measuring network performance, comprising:
   receiving, by a measurement controller, a measurement request;
   locating, by the measurement controller, measurement points participating in the measurement according to the measurement request, and delivering a measurement configuration to measurement points, wherein the measurement request contains a source IP address, a source port number, a destination IP address and a destination port number, wherein the step of locating measurement points participating in the measurement according to the measurement request comprises locating a first measurement point according to the source IP address and the source port number and locating a second measurement point according to the destination IP address and the destination port number;
   constructing, by the first measurement point, a notification packet containing the source IP address and the source port number of the first measurement point in a data field thereof, and sending the notification packet to the second measurement point via a network address translation (NAT) device;
   obtaining, by the second measurement point, a corresponding network address binding relationship according to an external IP address, an external port number, the source IP address and the source port number in the notification packet;
   constructing, by the second measurement point, a probe packet to be sent to the first measurement point according to the network address binding relationship, and initiatively sending the probe packet to the first measurement point via the NAT device; and
   calculating, by the first measurement point, network performance metrics, according to related information in the probe packet on receiving the probe packet by the first measurement point and reporting the network performance metrics to the measurement controller, or, on receiving the probe packet, generating and reporting, by the first measurement point, a packet abstract data to the measurement controller, and the measurement controller calculates the network performance metrics;
   wherein the NAT device is configured to:
   (a) substitute the external IP address and port number for the source IP address and port number in the notification packet, and send the notification packet to the second measurement point; and
   (b) substitute the IP address and port number of the first measurement point for the destination IP address and port number in the probe packet and send the probe packet to the first measurement point.

8. The method according to claim 7, wherein the first and the second measurement points, respectively, attach time stamp information to the packet for calculating the network performance metrics.

9. The method according to claim 8, wherein the first measurement point is located in a private network, and the second measurement point is located in a public network; or, the first measurement point is located in an IPv6 network, and the second measurement point is located in an IPv4 network.

10. A network system, comprising:
   a network address translation (NAT) device, configured to translate a network address;
   a measurement controller, configured to receive a measurement request, locate measurement points participating in the measurement according to the measurement request, and deliver a measurement configuration to measurement points, wherein the measurement request contains a source IP address, a source port number, a destination IP address and a destination port number, wherein the measurement points include a first measurement point which is located according to the source IP address and the source port number, and a second measurement point which is located according to destination IP address and the destination port number;
   a first device, configured to construct at the first measurement point of the measurement points a probe packet containing the source IP address and the source port number of the first measurement point in a data field thereof according to the measurement configuration, and then send the probe packet constructed by the first device to the second measurement point via the NAT device; and
   a second device, configured to receive the probe packet constructed by the first device at the second measurement point, and determine the source of the probe packet constructed by the first device according to the source IP address and the source port number in the probe packet constructed by the first device;
   wherein the second device calculates network performance metrics, according to related information in the probe packet constructed by the first device and reports the network performance metrics to the measurement controller; or, on receiving the probe packet constructed by the first device, the second device generates and reports a packet abstract data to the measurement controller, and the measurement controller calculates the network performance metrics;
   wherein the NAT device substitutes an external IP address and an external port number for the source IP address and the source port number in the probe packet constructed by the first device, and wherein the second measurement point further obtains a corresponding network address binding relationship, according to the external IP address, the external port number, the source IP address and the source port number in the probe packet.

11. The network system according to claim 10, wherein the second device obtains a corresponding network address binding relationship according to the external IP address, the external port number, the source IP address and the source port number in the probe packet constructed by the first device, then constructs a probe packet according to the binding relationship, and sends the probe packet constructed by the second device to the first device via the NAT device; and
   the first device calculates network performance metrics according to related information in the probe packet constructed by the second device and reports the network performance metrics to the measurement controller; or, on receiving the probe packet constructed by the second device, the first device generates and reports a packet abstract data to the measurement controller, and the measurement controller calculates the network performance metrics.

12. The network system according to claim 11, wherein the first device is located in a private network, and the second device is located in a public network; or, the first device is located in an IPv6 network, and the second device is located in an IPv4 network.

13. The network system according to claim 1, wherein the notification packet further includes first time stamp information when the first device sends the notification packet to the second measurement point via the NAT device; and
   the probe packet further includes second time stamp information when the second device sends the probe packet to the first device via the NAT device.

* * * * *

UNITED STATES PATENT AND TRADEMARK OFFICE
CERTIFICATE OF CORRECTION

| | | |
|---|---|---|
| PATENT NO. | : 8,005,011 B2 | Page 1 of 1 |
| APPLICATION NO. | : 12/250237 | |
| DATED | : August 23, 2011 | |
| INVENTOR(S) | : Daoyan Yang | |

It is certified that error appears in the above-identified patent and that said Letters Patent is hereby corrected as shown below:

Title page, under the section titled "(30) Foreign Application Priority Data," priority should only be claimed to CN Application No. 2006 1 0076979, filed April 14, 2006.

Signed and Sealed this
Third Day of July, 2012

David J. Kappos
*Director of the United States Patent and Trademark Office*